(12) United States Patent
Mills et al.

(10) Patent No.: US 6,843,541 B1
(45) Date of Patent: Jan. 18, 2005

(54) GLOVE BOX FOR WATER PIT APPLICATIONS

(75) Inventors: William C. Mills, Richland, WA (US); Richard A. Rabe, North Fork, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 132 days.

(21) Appl. No.: 10/162,612

(22) Filed: Jun. 6, 2002

(51) Int. Cl.$^7$ .............................................. A61G 11/00
(52) U.S. Cl. ...................................................... 312/1
(58) Field of Search ............................. 312/1, 31, 306, 312/312

(56) References Cited

U.S. PATENT DOCUMENTS

| | | | | |
|---|---|---|---|---|
| 2,403,203 A | * | 7/1946 | Yuung ............................ | 312/1 |
| 2,753,164 A | * | 7/1956 | Miller ........................ | 454/337 |
| 4,059,903 A | * | 11/1977 | Piet et al. ....................... | 312/1 |
| 4,781,511 A | * | 11/1988 | Harada et al. ............ | 414/217.1 |
| 4,815,912 A | * | 3/1989 | Maney et al. ............. | 414/217.1 |
| 4,960,143 A | * | 10/1990 | Dore et al. .................. | 134/199 |
| 5,085,746 A | * | 2/1992 | Musselman et al. ........ | 205/659 |
| 5,431,600 A | * | 7/1995 | Murata et al. .............. | 454/187 |
| 5,445,112 A | * | 8/1995 | Grosman ..................... | 119/265 |
| 5,704,381 A | * | 1/1998 | Millan et al. ............ | 134/102.2 |
| 5,713,711 A | * | 2/1998 | McKenna et al. ........ | 414/217.1 |
| 6,102,992 A | * | 8/2000 | Berg et al. ..................... | 96/361 |
| 6,471,037 B1 | * | 10/2002 | Matsumoto .............. | 198/465.2 |

FOREIGN PATENT DOCUMENTS

JP              4-194789        *  7/1992

* cited by examiner

*Primary Examiner*—Janet M. Wilkens
(74) *Attorney, Agent, or Firm*—Julia C. Moody; Paul A. Gottlieb

(57) ABSTRACT

A glove box assembly that includes a glove box enclosure attached to a longitudinally extending hollow tube having an entranceway, wherein the portion of the tube is in a liquid environment. An elevator member is provided for raising an object that is introduced into the hollow tube from the liquid environment to a gas environment inside the glove box enclosure while maintaining total containment.

9 Claims, 4 Drawing Sheets

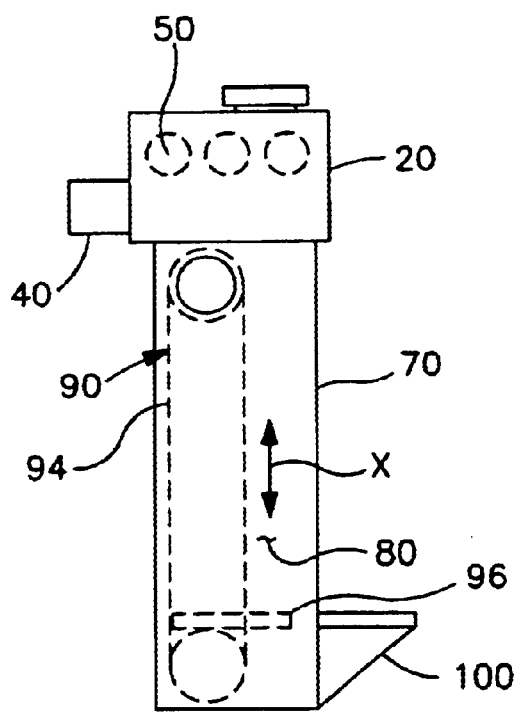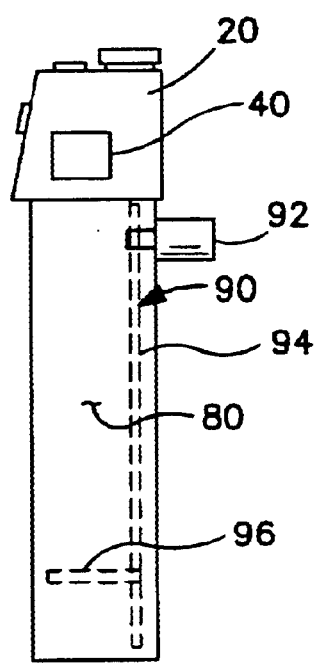
FIG. 3  FIG. 4

US 6,843,541 B1

GLOVE BOX FOR WATER PIT APPLICATIONS

CONTRACTUAL ORIGIN OF THE INVENTION

The United States Government has rights in this invention pursuant to a contract with the U.S. Department of Energy.

BACKGROUND OF THE INVENTION

1. Field of the Invention

The present invention relates, in general, to containment enclosures and, more particularly, to a glove box for water pit applications.

2. Description of the Prior Art

The use of containment enclosures is widespread for handling and treating materials, particularly hazardous materials, in a controlled or contained environment. In particular, glove boxes are enclosures that generally contain viewing windows, gloves to permit work functions without personnel contamination, access ports, service ports, and a transfer box.

One of the major problems associated with the use of enclosed atmospheric glove boxes is introducing or removing articles without affecting the type of environment in use or without presenting a hazard to personnel and the environment outside of the glove box. Many of these articles, particularly in the nuclear industry, are highly radioactive and may possibly contaminate the surrounding area with radioactive nuclear material if not properly handled. Articles that are in a water environment may present additional handling problems when introducing the article from the water environment into the enclosed atmospheric glove box while maintaining total containment of the article.

It is, therefore, an object of the present invention to introduce articles directly from a water environment into a contained glove box enclosure and returned back to the water environment while maintaining total containment.

SUMMARY OF THE INVENTION

The present invention is an apparatus for working on an article that includes a hollow first portion having an open bottom end, a hollow second portion having a first end and a second end, and a third portion having an open first end The first end of the second portion is attached to the open bottom end of the first portion. The open first end of the third portion is in communication with the second end of the second portion. The third portion includes an entranceway defined therein for introducing an article into the third portion. A longitudinally extending passageway is defined by the first portion, second portion, and the third portion.

The apparatus also includes an elevator member received within the passageway and is capable of moving along a longitudinal axis from the entranceway of the third portion to the first portion, whereby an article can be ported by the elevator member from the third portion to the first portion and returned back to the third portion via the passageway. The elevator member includes a drive motor, a conveyor in communication with the motor, and a base attached to the conveyor for raising and lowering articles along a longitudinal axis from the entranceway in the third portion to the open bottom end of the first portion. At least a portion of the elevator member and at least a portion of the third portion are capable of being submerged in a liquid.

The first portion defines a glove box enclosure that includes at least one access port and a sleeve sealed to the access port for enabling the admission of a hand into the glove box enclosure for manipulation of an article therein. The first portion also includes enclosure walls defining an interior cavity, wherein at least one wall has a transparent window enabling a user to view into the interior cavity of the first portion. The enclosure walls can be made of stainless steel. The first portion further includes a light for lighting the interior cavity and a transfer box for inserting and removing objects from the interior cavity of the first portion while maintaining a contained environment.

The second portion and the third portion define a hollow tube. A loading platform is attached to the third portion for introducing an article onto the base of the elevator member through the entranceway of the third portion. The base can include a pair of forks adapted to receive a sliding table cart within the entranceway of the third portion. A column of liquid is contained within at least a portion of the third portion. The first portion defining an interior cavity is filled with gas whereby an interface between the gas and the liquid is defined in the passageway.

The present invention is also a method for working on an article that is transferred from a liquid environment to a gas environment while maintaining total containment includes the steps of providing an apparatus for working on an article as previously described. Next a article is loaded from a liquid environment onto the elevator member inside the third portion. The article is then raised out of the liquid environment to a contained gas environment inside the first portion. Finally, after the article is worked upon, the article is returned back to the liquid environment inside the third portion.

BRIEF DESCRIPTION OF THE DRAWINGS

A complete understanding of the invention will be obtained from the following description when taken in connection with the accompanying drawing Figures, wherein like reference characters identify like parts throughout.

FIG. 3 is a rear elevational view of the glove box assembly, shown in FIG. 1, showing an elevator member in phantom inside the glove box assembly;

FIG. 4 is a side elevational view of the glove box assembly, shown in FIG. 1;

DETAILED DESCRIPTION OF THE INVENION

Figure 1:
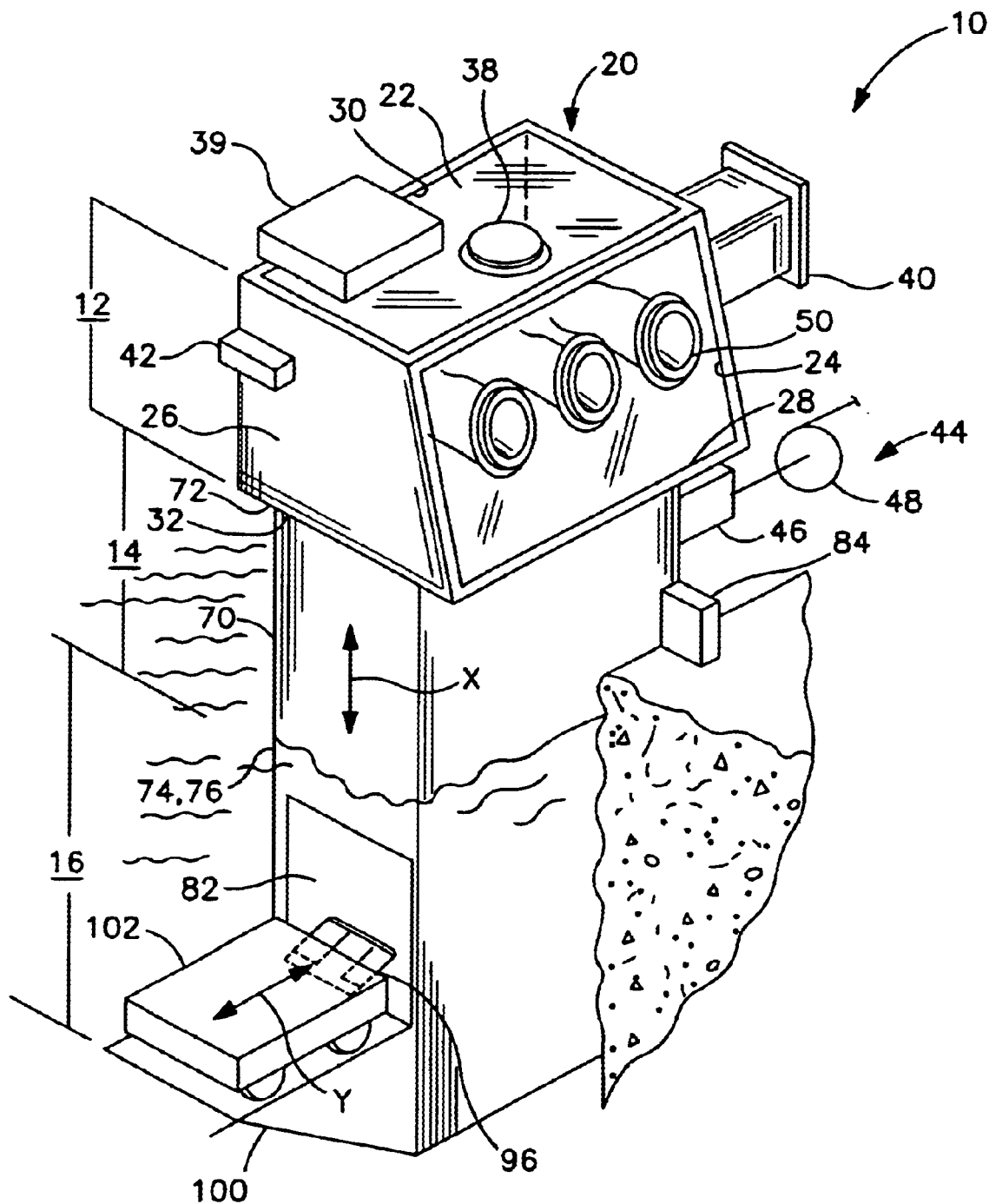
FIG. 1 is a perspective view of a glove box assembly made in accordance with the present invention.
Figure 2:
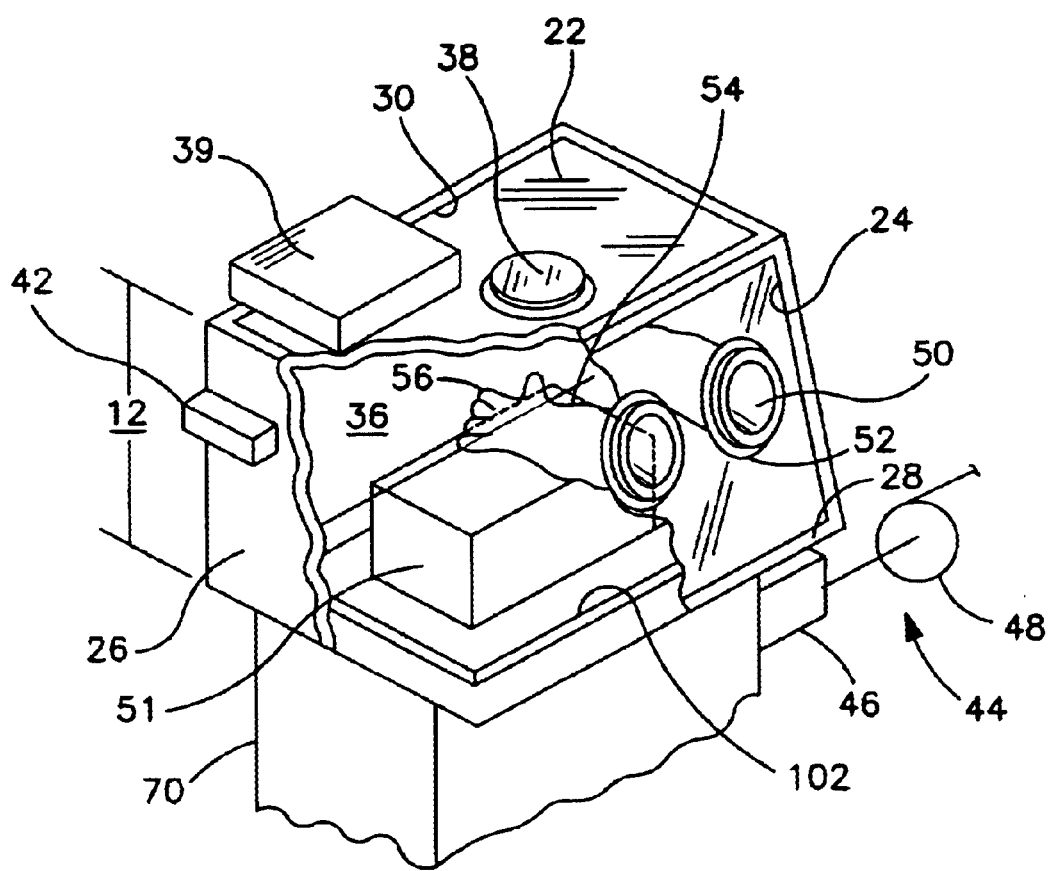
FIG. 2 is a perspective view, partially cut away and in portion, of the glove box assembly shown in FIG. 1.
Figure 7:
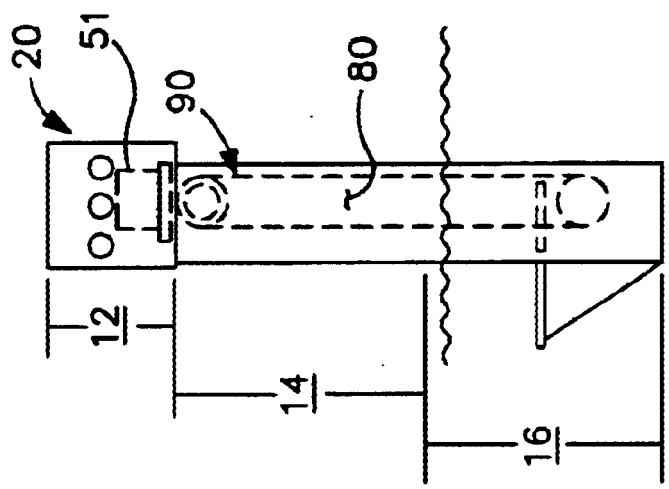
FIG. 7 is a front elevational view of the glove box assembly, shown in FIG. 5, showing the article in phantom inside a glove box enclosure.

Referring to FIGS. 1–3, the present invention is a glove box assembly 10 made in accordance with the present invention that includes a hollow first portion 12, a hollow second portion 14 and a hollow third portion 16. The fist portion 12 defines a glove box enclosure 20 having an open bottom end 32. Glove box enclosures are well-known in the art. The glove box enclosure 20 includes a first wall 22, a second wall 24, a third wall 26, a fourth wall 28, and a fifth wall 30 defining an interior cavity 36 (shown in FIG. 2). The walls 22, 24, 26, 28, and 30 can be made of stainless steel. The glove box enclosure 20 flier includes a transparent window 38 defined in the first wall 22 for enabling the user to view into the interior cavity 36 of the glove box enclosure 20. The window 38 can be made of a transparent material, such as Lexan. The first wall 22 also includes a light 39 for lighting the interior cavity 36 of the glove box enclosure 20. The second wall 24 includes a transfer box 40 for inserting or removing articles from the interior cavity 36 of the glove box enclosure 20 while maintaining a contained environment. Transfer boxes are well-known in the art. The third wall 26 includes an air inlet 42 to work in combination with an exhaust system 44 having a filter 46 and a pump 48 (shown in FIG. 2) in order to maintain a controlled low pressure environment that is lower than atmospheric pressure within the glove box enclosure 20. The fourth wall 28 includes at least one access port 50 (generally there are two or more for the user's two arms), wherein the access port 50 is preferably circular. The access ports 50 (shown in FIG. 2) enable the admission of a hand into the glove box enclosure 20 for manipulation of an article 51 therein. A ring 52 is fixed to the fourth wall 28 surrounding the access port 50. A sleeve 54 for protecting the arm and forearm, as well as a glove 56 for protecting the hand, are integrally attached to each other and are fixed in detachable manner to the ring 52. The sleeve 54 and the glove 56 are made of a flexible material, such as rubber.

The hollow second portion 14 of the glove box assembly 10 includes a first end 72 and a second end 74. The first end 72 of the second portion 14 is attached to the open bottom end 32 of the glove box enclosure 20. The hollow third portion 16 having an open first end 76 is in communication with the second end 74 of the second portion 14. The second portion 14 and the third portion 16 define a hollow tube 70. A longitudinally extending passageway 80 is defined by the first portion 12, the second portion 14, and the third portion 16. An entranceway 82 is defined in the third portion 16 for introducing the article 51 into the passageway 81 of the third portion 16.

Referring to FIGS. 3 and 4, an elevator member 90 is provided within the passageway 80. The elevator member 90 includes a drive motor 92, a conveyor 94 in communication with the drive motor 92, and a base 96 attached to the conveyor 94. The elevator member 90 is capable of transporting the article 51 along a longitudinal axis X from the entranceway 82 in the third portion 16 to the open bottom end 32 in the first portion 12 and returning the article 51 back to the third portion 16 via the passageway 80. The base 96, which moves along the longitudinal axis X, can be a pair of forks (shown in FIG. 1). A loading platform 100 is attached to the third portion 16 for introducing the article 51 into the third portion 16. A sliding table cart 102 (shown in FIG. 1), which is capable of holding the article 51, is used to transport the article 51 along a longitudinal axis Y from the loading platform 100 onto the base 96 of the elevator member 90 through the entranceway 82 of the third portion 16.

Referring to FIGS. 1 and 5–7, a section of the hollow tube 70, which can include a portion of the third portion 16 and/or the second portion 14, is capable of being submerged in a liquid, such as water. The interior cavity 36 of the glove box enclosure 20, which includes the first portion 12, is filled with gas, such as air or argon, whereby an interface between the gas and the liquid is defined in the passageway 80 of the hollow tube 70. The second portion 14 of the hollow tube 70 above the liquid environment includes the exhaust system 44. A support bracket 84 (shown in FIG. 1) is attached to the hollow tube 70 for supporting the glove box assembly 10, wherein a section of the hollow tube 70 is in a liquid environment. The support bracket 84 can extend from one side of the hollow tube 70 to an opposite side (not shown) and can be attached to either side of the hollow tube 70.

Figure 6:
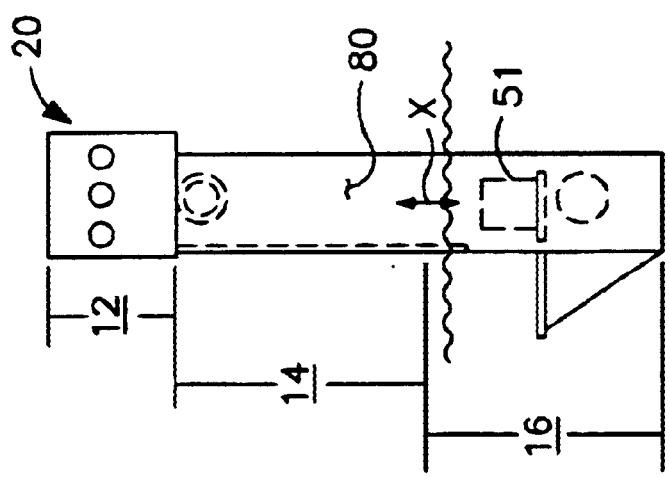
FIG. 6 is a front elevational view of the glove box assembly, shown in FIG. 5, showing the article on a base of an elevator member all in phantom.
Figure 5:
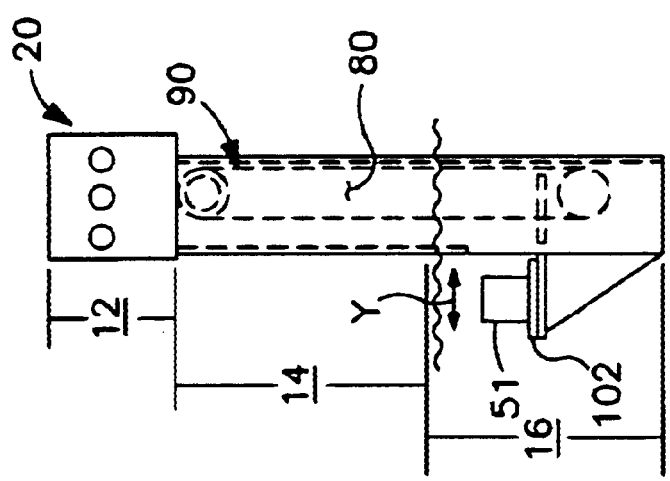
FIG. 5 is a front elevational view of the glove box assembly, shown in FIG. 1, showing an article on a loading platform.

In operation, the article 51 is transferred from a liquid environment to a gas environment while maintaining total containment via the following procedure. First, providing a glove box assembly 10 as previously described, wherein a section of the hollow tube 70 is submerged in a liquid environment, such as in water pit applications. The sliding table cart 102 is placed on the loading platform 100 before submersion into the liquid environment. Second, placing the article 51, which is in the liquid environment, onto the sliding table cart 102. The article 51 can be placed on the sliding table cart 102 by an operator using a mechanical device or by underwater divers placing the article 51 onto the sliding table cart 102. A, loading the sliding table cart 102 onto the base 96 of the elevator member 90, as shown in FIG. 6. The elevator member 90 includes controls (not shown) to raise and lower the base 96 between the entranceway 82 in the third portion 16 and the open bottom end 32 in the first portion 12. Fourth, raising the article 51 from the liquid environment to the gas environment inside the passageway 80 of the hollow tube 70 via the elevator member 90. Fifth, stopping the elevator member 90, wherein the sliding table cart 102 is positioned at the open bottom end 32 of the glove box enclosure 20 in the first portion 12. The sliding table cart 102 is capable of being used as a base for working on the article 51 on the interior cavity 36 of the glove box enclosure 20. Finally, after article 51 is worked upon, the article 51 is returned back to the liquid environment via the elevator member 90.

It will be understood by those skilled in the art that while the foregoing description set forth in detail preferred embodiments of the present invention, modifications, additions, and changes might be made thereto without departing from the spirit and scope of the invention.

We claim:

1. A containment enclosure apparatus, said apparatus comprising:

a hollow first portion having an open bottom end wherein said first portion defines a glove box enclosure, said first portion comprising at least one access port and a sleeve sealed to said access port enabling the admission of a hand into said glove box enclosure for manipulation of an article therein;

a hollow second portion having a first end and a second end; said first end of said second end portion attached to said open bottom end of said first portion;

a third portion having an open first end in communication with the second end of said second portion, said third portion having an entranceway defined therein for introducing an article into said third portion;

a longitudinally extending passageway defined by said first portion, said second portion, and said third portion;

an elevator member received within said passageway comprising a base that moves along a longitudinal axis from said entranceway of said third portion to said first portion, whereby an article can be transported by said elevator member from said third portion to said first portion and returned back to said third portion via said passageway, wherein at least a portion of said elevator member and at least a portion of said third portion capable of being submerged in a liquid; and a column of liquid contained within at least a portion of said third portion, said first portion defining an interior cavity filled with gas whereby an interface between said gas and said liquid is defined in said passageway.

2. The apparatus as claimed in claim 1, wherein said first portion further comprises glove box enclosure walls defining an interior cavity wherein at least one wall has a transparent window enabling a user to view into said interior cavity of said first portion.

3. The apparatus as claimed in claim 2, wherein said first portion further comprises a light for lighting said interior cavity of said first portion.

4. The apparatus as claimed in claim 2, wherein said first portion further comprises a transfer box for inserting and removing objects from said interior cavity of said first portion while maintaining a contained environment.

5. The apparatus as claimed in claim 2, wherein said glove box enclosure walls are made of stainless steel.

6. The apparatus as claimed in claim 1, further comprising a loading platform attached to said third portion for introducing an article onto said base of said elevator member through said entranceway of said third portion.

7. The apparatus as claimed in claim 1, wherein said elevator member comprises:

a drive motor;

a conveyor in communication with said drive motor;

a base attached to said conveyor for raising and lowering articles along a longitudinal axis from said entranceway in said third portion to said open bottom of said first portion; and wherein said base comprises a pair of forks adapted to receive a sliding table cart within said entranceway of said third portion.

8. A method for working on an article that is transferred from a liquid environment to a gas environment while maintaining total containment, said method comprising:

(a) providing an apparatus comprising a hollow first portion having an open bottom end, a hollow second portion having a first end and a second end, said first end of said second portion attached to said open bottom end of said first portion, a third portion having an open first end in communication with the second end of said second portion, said third portion having an entranceway defined therein for introducing an article into said second portion; a longitudinally extended passageway defined by said first portion, said second portion, and said third portion, an elevator member received within said passageway capable of moving along a longitudinal axis from said third portion entranceway to said first portion, whereby an article can be transported by said elevator member from said third portion to said first portion and returned back to said first portion via said passageway, and at least a portion of said elevator member and at least a portion of said third portion capable of being submerged in a liquid;

(b) loading an article onto said elevator member inside said third portion in a liquid environment; and (c) raising said article out of said liquid environment to a contained gas environment inside said first portion.

9. The method claimed in claim 8, further comprising the step of returning said article from first said portion back to said entranceway of said third portion.

* * * * *